3,416,842
LOADING AND UNLOADING EQUIPMENT
Jacobus Marinus Donkers, Zaandam, Netherlands, assignor to Verschure & Co's Scheepswerf en Machinefabriek N.V.
Filed Aug. 21, 1967, Ser. No. 661,936
Claims priority, application Netherlands, Aug. 23, 1966, 6611859
10 Claims. (Cl. 302—34)

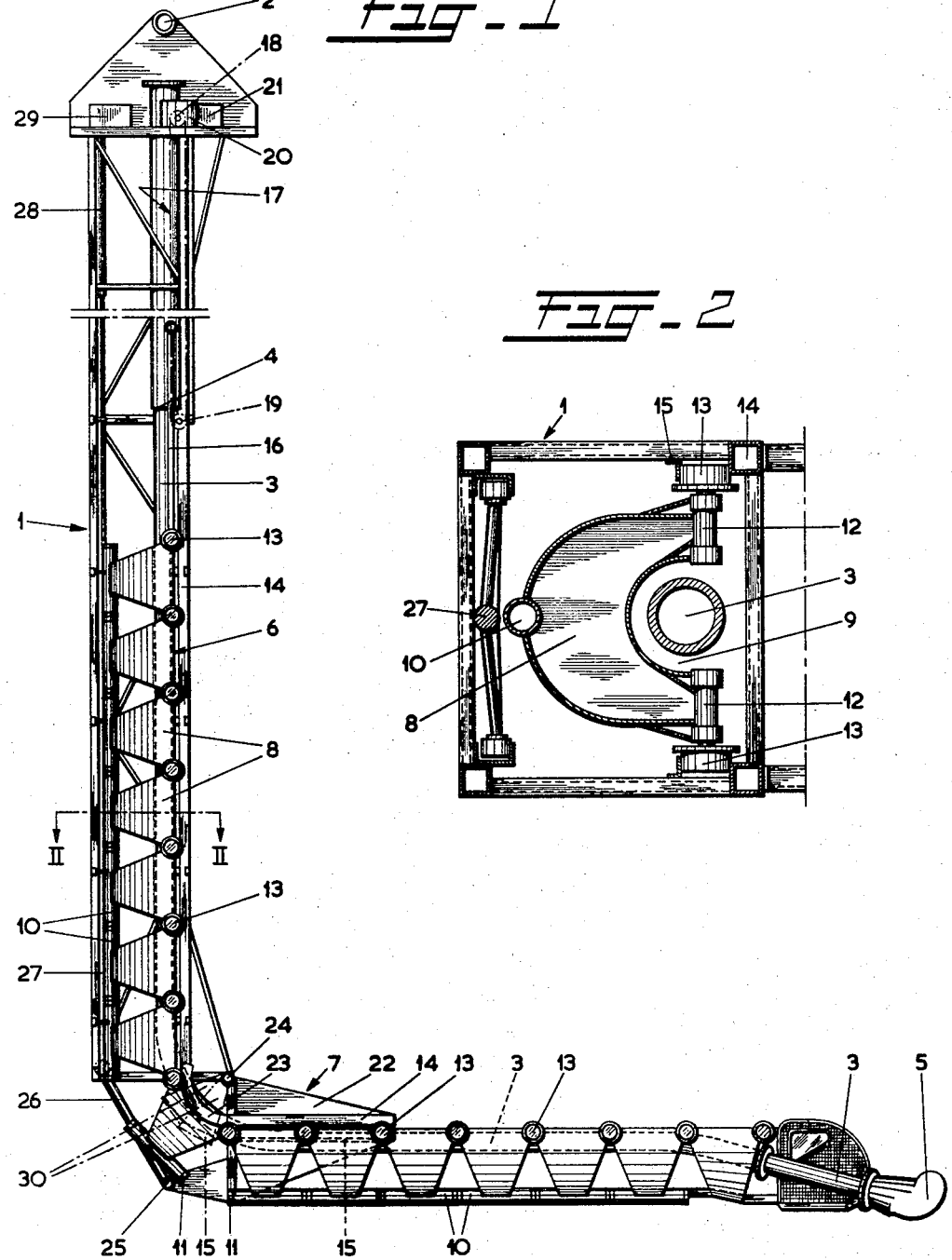

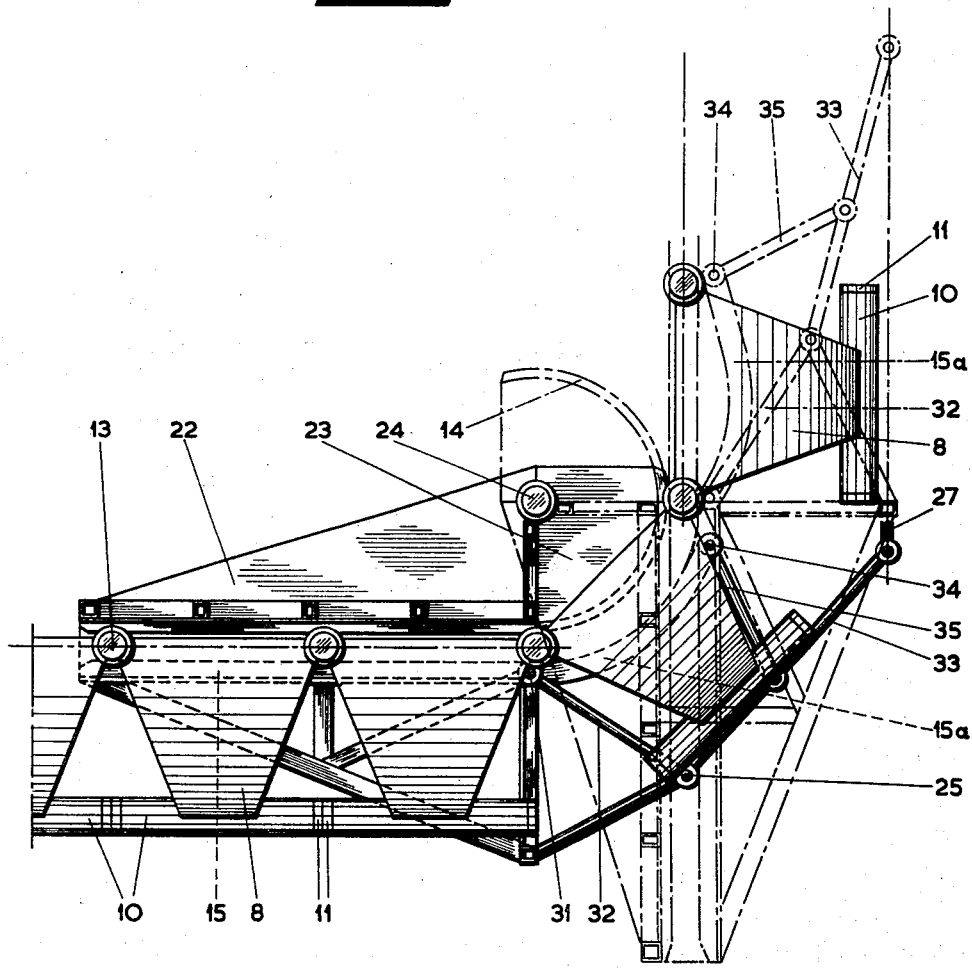

ABSTRACT OF THE DISCLOSURE

Loading and unloading equipment comprises an upright tower and a conveyor support carried by and movable on the tower. The conveyor support comprises a train of articulately interconnected members, and the tower has a guide by which these are directed laterally. The interconnected members rest on and support each other so that they extend laterally outward beyond the tower in cantilever fashion. The tower can thus have desirably small horizontal dimensions and need not have any horizontally extensible portion.

---

The present invention relates to loading and unloading equipment, more particularly of the type that is lowered into and raised from a ship's hold. Equipment of this type comprises an upright tower and a laterally extending support, and a conveyor member extending along the tower and along the laterally extending support. The conveyor may be for example a suction pipe or a pneumatic conveyor or a power driven conveyor or the like.

In known apparatus of this type, the laterally extending support has often been in the nature of a telescoping arm, so as to be laterally extensible and retractable. However, such equipment is complicated and difficult to operate.

Accordingly, it is an object of the present invention to provide loading and unloading equipment of this general type, in which there is no need to provide a laterally extending telescoping arm.

Another object of the present invention is the provision of such loading and unloading equipment, of which the horizontal dimensions are desirably small.

Finally, it is an object of the present invention to provide loading and unloading equipment, which will be relatively simple and inexpensive to manufacture, easy to position and operate and maintain and repair, and rugged and durable in use.

Other objects and advantages of the present invention will become apparent from a consideration of the following description, taken in connection with the accompanying drawings, in which:

FIGURE 1 shows a side elevational view of a first embodiment of the invention;

FIGURE 2 shows an enlarged cross-sectional view along the line II—II in FIG. 1; and FIGURE 3 shows, in enlarged fragmentary side elevation, a second embodiment of the invention.

Referring now to the drawings in greater detail, the loading and unloading equipment of the embodiment of FIG. 1 comprises a substantially vertical tower 1, which may be suspended at 2 on the jib of a crane installation, not shown in the drawing, and by means of this installation can be placed in the holds of a ship. Extending in the tower is a suction pipe 3, which can be telescoped in and out at 4 and is provided with an agitator 5 at its end. The invention relates in particular to means by which the lower portion of this suction pipe 3 or other conveyor can extend sideways with respect to the tower over a variable length. To this end this portion of the suction pipe is supported by or received in a support, consisting of a chain 6 which can be pushed into and out of the tower 1 via a bend guide 7, the pushed-out portion of the chain being rigid at least in the direction of the load.

The longitudinal section of the links 8 of the chain has the form of a trapezium and their cross section (FIG. 2) has the form of a semi-ring, the suction pipe 3 being received in the hollow 9 of the semi-ring. Fitted on the shorter parallel side of the central longitudinal section of each link 8 is a push rod 10, which is provided with replaceable push plates 11 at its two ends. If the links 8, which are hinged with respect to each other about the hinge pins 12, are in line with each other, only the push plates 11 rest against each other, so that no impermissible loads on the link can occur.

Mounted on the hinge pins 12 between the links are flanged wheels 13, each of which is guided between two rails 14 and 15, which rails are secured in the tower 1 and in the bend guide 7.

The end of the chain 6 which is present in the tower is connected with a pull rod or push rod 16, which in turn is fastened to an endless chain 17, which is passed about two sprocket wheels 18 and 19, of which the sprocket wheel 18 can be rotated by the driving unit 20, so as to push the chain 6 sideways into and out of the tower 1 via the bend guide 7.

The tower 1, with the chain 6 and the suction pipe 3, can be swung about its own axis, because on the tower is provided a rotatable gearing with a toothed ring (not shown), with which meshes a gear wheel driven by the unit 21.

The bend guide 7 shown in FIG. 1 consists of a shoe 22 with rectilinear rails 14 and 15 and a bend 23 connected with the shoe, which bend acts as inner rails curved susbtantially in a circle. The length of the rails 14 and 15 on the shoe 22 should be at least equal to the distance between two link hinges. The shoe 22 with the bend 23 hinges about a hinge pin 24 connected with the tower, the lower end of the shoe 22 turned towards the tower being hinged to a rod 26, which in turn is hinged to a rod 27 extending parallel to the tower over its whole height. Said rod 27 is provided at the top with a screw spindle 28, about which engages a threaded sleeve to be driven by the unit 29. The angle which the bend guide 7 includes with the tower 1 can be varied by rotation of the threaded sleeve.

If this angle is reduced, the parts of the inner rails 14 of the bend 23 which are arranged near the tower will swing away from the tower. If the outer rails 15 of this bend 23 were rigidly connected with the shoe 22, the parts of the rails 15 turned towards the tower, upon reduction of said angle, would block the passage for the wheels 13 towards the corresponding rails 14 and 15 in the tower 1, or these parts might come into contact with the tower.

The solution of this problem shown in FIG. 1 consists in that the outer rails 15 in the bend 23 are fitted on a telescoping structure 30 hinged about the spindle 24, which structure telescopes together upon reduction of the angle between the shoe 22 and the tower 1.

FIG. 3 shows another solution. In this case the outer rail 15a of the bend, which may be slightly curved or rectilinear, is hinged, at the end 31 turned towards the shoe 22, to the shoe 22 and via rods 32 and 33 to the rod 27 to be moved parallel to the tower. The opposite end 34 of rail 15a is secured via hinged rods 35 and 33 to the rod 27 to be moved parallel to the tower. If said rod 27 is moved by means of the screw spindle and threaded sleeve mentioned in connection with FIG. 1, the end 34 of the outer rail moves parallel or substantially parallel to the tower 1, while the end 31 hinges about the spindle 24. The position in which the bend guide has swung through 90° to extend in line with the tower 1 is shown by dotted lines.

It is to be noted that the illustrated embodiments have been discussed only by way of example, and that many variants within the scope of the invention are possible.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Thus it is possible to fit on or against the chain-shaped support many types of conveyors, such as a traveling crab, a suction cap that can be moved by means of a winch, a roller conveyor, a dirt collector or dredger, etc. The form of a link may, for instance, be triangular or rectangular in cross section. If further the chain support is pushed in by pulling at the top of the tower and pushed out by pulling at the free end of the support, the bend guide may consist exclusively of the shoe with rectilinear rails, without a curved portion. The vertical tower can be held in position by clamping the tower to the edge of a deck or the like. Further, there is a possibility of fitting pull rods on the links at the side corresponding with the inner bend instead of fitting push rods on the opposite side of the links, said pull rods being temporarily folded in as the bend is passed. These and other modifications and variations are considered to be within the purview and scope of the present invention as defined by the appended claims.

Having described my invention, I claim:

1. Loading and unloading equipment, comprising an upright tower, a support comprising a plurality of articulately interconnected members, means mounting the support on the tower for movement lengthwise of the tower, guide means carried by the tower for directing a portion of the support laterally outwardly of the tower and guide means, means on said members that interengage between adjacent said members along the laterally outwardly extending portion of the support to maintain said portion laterally outwardly extended, and a conveyor carried by said support.

2. Loading and unloading equipment as claimed in claim 1, and opposed rail means carried by said guide means, and wheels on said members that lie between said rail means.

3. Loading and unloading equipment as claimed in claim 1, and means mounting said guide means on said tower for vertical swinging movement about a horizontal axis.

4. Loading and unloading equipment as claimed in claim 3, and means for swinging said guide means vertically relative to the tower.

5. Loading and unloading equipment as claimed in claim 4, said guide means being comprised on telescoping sections that swing relative to each other about said axis.

6. Loading and unloading equipment as claimed in claim 4, a portion of said guide means being pivotally interconnected to a relatively fixed portion of said guide means at the portion of said pivoted portion which is farthest from the top of the tower.

7. Loading and unloading equipment as claimed in claim 2, said wheels having axles which pivotally interconnect said members.

8. Loading and unloading equipment as claimed in claim 1, said interengaging means comprising abutments on both ends of each said member and spaced a substantial distance from the points of articulation of said members.

9. Loading and unloading equipment as claimed in claim 8, said abutments being provided by replaceable plates.

10. Loading and unloading equipment as claimed in claim 1, each of said members being in the shape of a box that has a longitudinal section in the form of a trapezium.

References Cited

UNITED STATES PATENTS

| 1,845,352 | 2/1932 | Smith et al. | |
| 3,273,942 | 9/1966 | McFarland | 302—34 |

FOREIGN PATENTS 373,314   12/1963   Switzerland.

ANDREAS NIELSEN, *Primary Examiner.*